(12) United States Patent
Ookubo

(10) Patent No.: US 7,516,189 B2
(45) Date of Patent: Apr. 7, 2009

(54) INFORMATION TRANSMISSION METHOD AND HOST DEVICE

(75) Inventor: Kazuo Ookubo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1005 days.

(21) Appl. No.: 10/985,625

(22) Filed: Nov. 10, 2004

(65) Prior Publication Data

US 2006/0062219 A1  Mar. 23, 2006

(30) Foreign Application Priority Data

Sep. 17, 2004  (JP) ............................. 2004-270854

(51) Int. Cl.
*G06F 15/167* (2006.01)
(52) U.S. Cl. .................. 709/214; 709/202; 709/211; 709/218; 707/201
(58) Field of Classification Search ................. 709/202, 709/211, 213–216, 218; 707/201
See application file for complete search history.

(56) References Cited

U.S. PATENT DOCUMENTS 6,766,359 B1 * 7/2004 Oliveira et al. .............. 709/213

2001/0037371 A1 * 11/2001 Ohran ......................... 709/214
2003/0061297 A1 * 3/2003 Fujimoto ..................... 709/213

FOREIGN PATENT DOCUMENTS

JP        05-257840        10/1993

* cited by examiner

*Primary Examiner*—David Lazaro
(74) *Attorney, Agent, or Firm*—Townsend and Townsend and Crew LLP

(57) ABSTRACT

An information transmission method that transmits information from a first host device connected to a first network to a second host device connected to a second network, comprising the steps of writing information from the first host device to a shared storage region of a first storage device that is connected to the first network; reading information that is stored in the shared region of the first storage device by means of a third host device that is connected to the first network and the second network; writing the read information to a shared region of a second storage device that is connected to the second network by means of the third host device; and reading information that has been written to the shared region of the second storage device by means of the second host device.

7 Claims, 13 Drawing Sheets

FIG. 3A

| WWN OF STORAGE SUBSYSTEM | IDENTIFIER OF LVM CONSTITUTING SHARED REGION | NOTIFICATION DESTINATION CONTROL INFORMATION |
|---|---|---|
| 3A 59 52 9D A8 6C | (IDENTIFIER OF LVM 11A3) | −*,+(IP_Addr 1),+(IP_Addr 2) |
| 62 A3 4E 33 90 A1 | (IDENTIFIER OF LVM 11A1) | +*,−(IP_Addr 4) |
| 62 A3 4E 33 90 A1 | (IDENTIFIER OF LVM 11A2) | +*,−(IP_Addr 3) |
| ⋮ | ⋮ | ⋮ |

↙ 153A SHARED REGION MANAGEMENT TABLE

FIG. 3B

| TRANSMISSION SOURCE ID | TRANSMISSION TARGET NAME | LATEST UPDATE DATE AND TIME | LATEST UPDATE PARTY | VALID DEADLINE | REGISTRATION DESTINATION | VALID/ INVALID | ACQUISITION SOURCE REGION |
|---|---|---|---|---|---|---|---|
| (WWN)- (YYYYMMDDhhmmss) | aa. zip | (YYYYMMDD hhmmss) | (WWN OF HOST) | (YYYYMMDD hhmmss) | (DIR NAME) | 0/1 | (WWN)-(LVM) |
| ⋮ | ⋮ | ⋮ | ⋮ | ⋮ | ⋮ | ⋮ | ⋮ |

↙ 129A TRANSMISSION TARGET MANAGEMENT TABLE

FIG. 3C

| WWN OF STORAGE SUBSYSTEM | IDENTIFIER OF LVM CONSTITUTING SHARED REGION | SAN | PREVIOUS ACCESS DATE AND TIME |
|---|---|---|---|
| 3A 59 52 9D A8 6C | (IDENTIFIER OF LVM 11A3) | FIRST SAN | 2004/8/27/15:30:39 |
| 62 A3 4E 33 90 A1 | (IDENTIFIER OF LVM 11A1) | FIRST SAN | 2004/8/26/8:32:40 |
| ⋮ | ⋮ | ⋮ | ⋮ |

↙ 123A ACCESS CONTROL TABLE

FIG. 4

| SELEC-TION | TRANS-MISSION SOURCE ID | TRANS-MISSION TARGET NAME | LOCATION | LATEST UPDATE DATE | VALID DEADLINE | VALID/ INVALID | OPERATION |
|---|---|---|---|---|---|---|---|
| ☐ | | | | | | | DELETE ▶ |
| ☐ | | | | | | | DELETE ▶ UPDATE |
| ☐ | | | | | | | ▶ |
| ☐ | | | | | | | ▶ |
| ☐ | | | | | | | ▶ |
| ☐ | | | | | | | ▶ |
| ☐ | | | | | | | ▶ |
| ☐ | | | | | | | ▶ |
| ☐ | | | | | | | ▶ |
| ☐ | | | | | | | ▶ |

ADD NEW    RUN host: sunb2k18
IP: 10.208.91.123

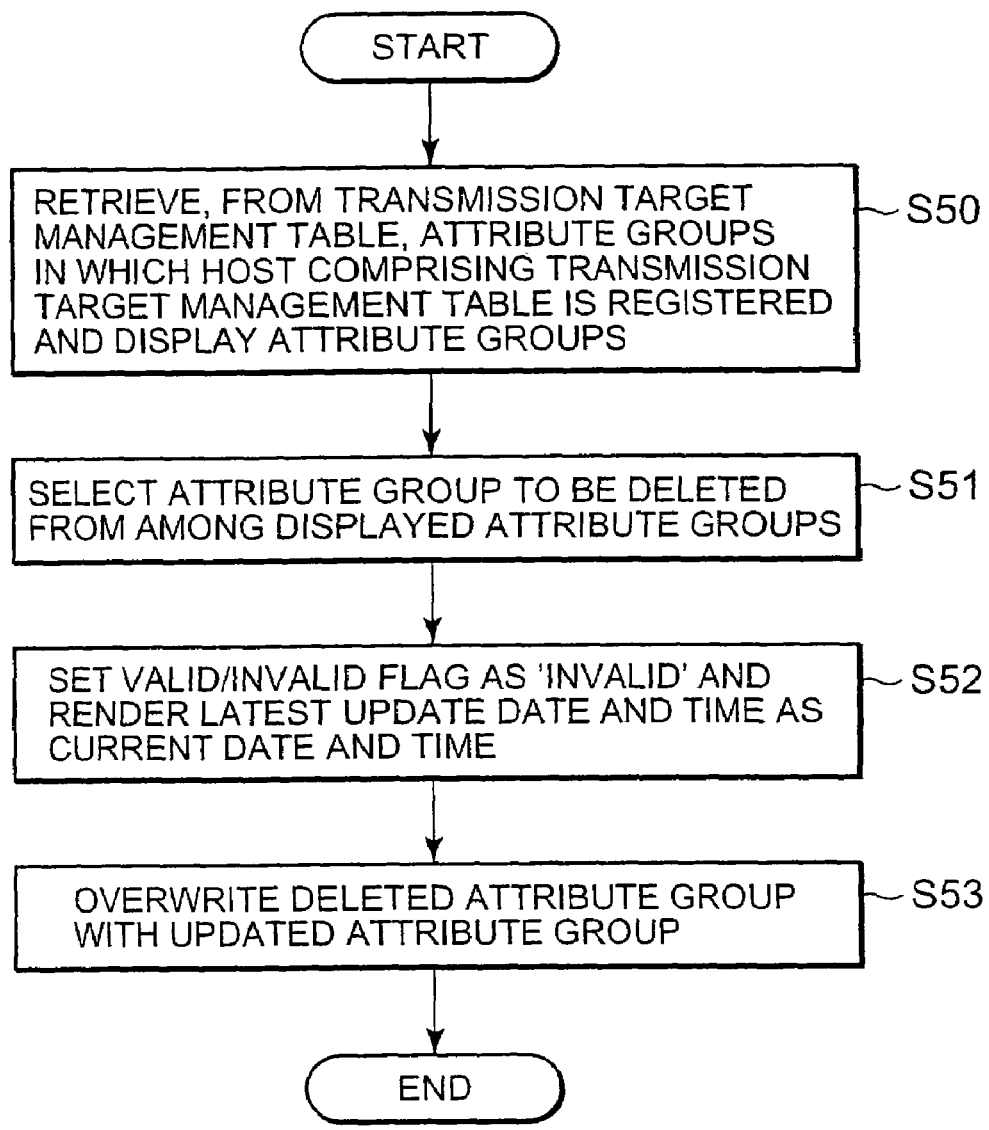

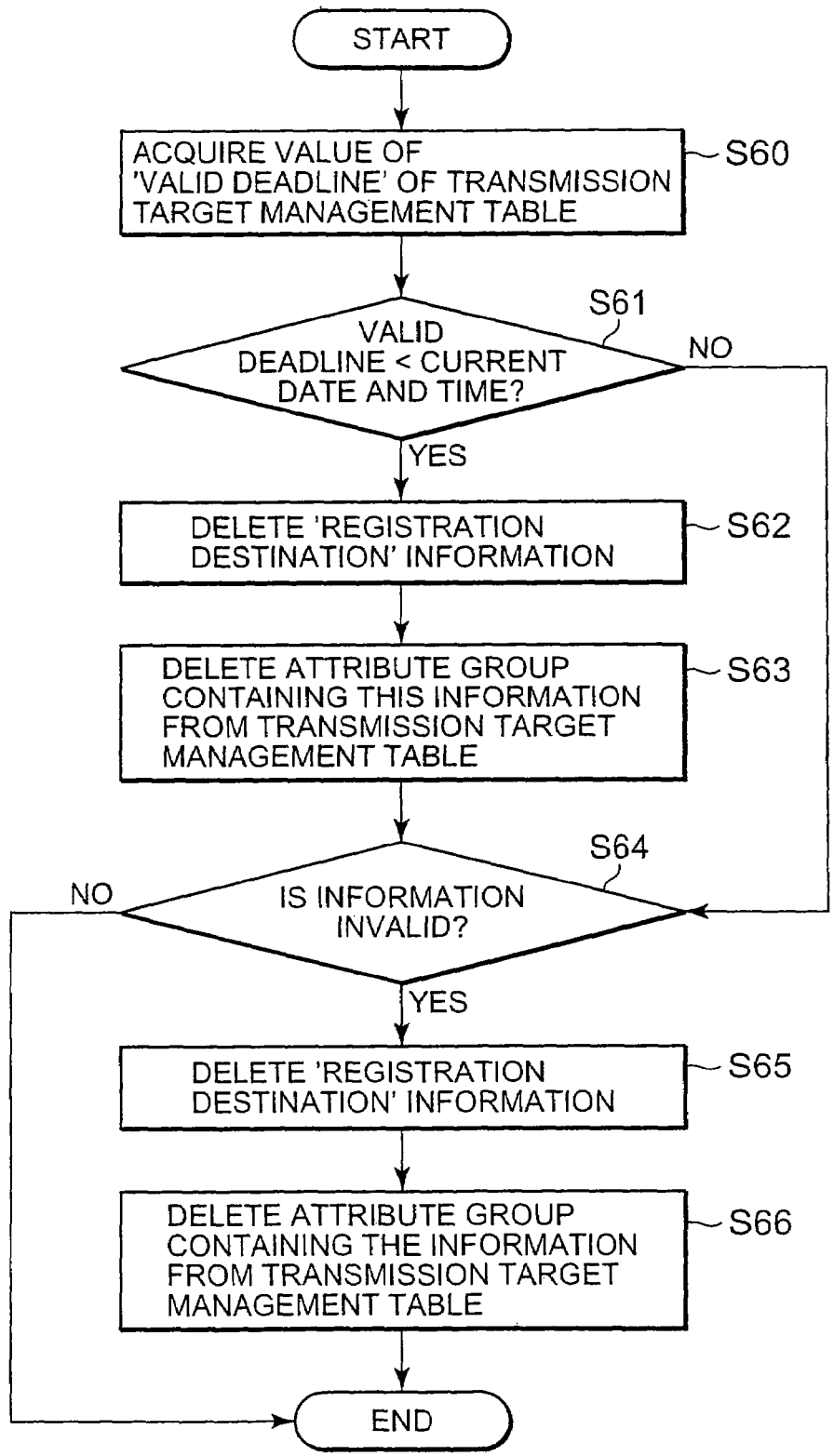

INFORMATION TRANSMISSION METHOD AND HOST DEVICE

CROSS-REFERENCE TO PRIOR APPLICATION

This application relates to and claims priority from Japanese Patent Application No. 2004-270854, filed on Sep. 17, 2004, the entire disclosure of which is incorporated herein by reference.

BACKGROUND OF THE INVENTION 1. Field of the Invention

The present invention relates to a technology for transmitting information via a communication network. 2. Description of the Related Art As this type of technology, the dispersion bulletin board system disclosed by Japanese Patent Application Laid Open No. H5-257840, for example, is known. This dispersion bulletin board system comprises a bulletin board system, and another bulletin board system. The bulletin board system comprises a plurality of temporary storage bulletin boards, a bulletin board portion, and a distributed processing unit. The other bulletin board system comprises a reception processing unit and a bulletin board portion. The distributed processing unit carries a distribution table in which a plurality of distribution destination names (names of bulletin board portions) corresponding with the plurality of temporary storage bulletin boards are registered. When information is written in a certain temporary storage bulletin board of the bulletin board system, the distributed processing unit specifies the name of the distribution destination that corresponds with the certain temporary storage bulletin board and transfers information that is written in the certain temporary storage bulletin board to the bulletin board portion determined from the specified distribution destination name.

SUMMARY OF THE INVENTION

According to the aforementioned related art, in order to distribute information, the name of the information distribution destination must be grasped beforehand and then the name of the distribution destination thus grasped must be registered. However, the ability to grasp all the transmission destinations is not necessarily limited by the system constitution.

For example, in a system in which a first SAN (Storage Area Network) and first LAN (Local Area Network), and a second SAN and second LAN are indirectly connected via a first host device, when a second host device is connected to the first SAN and first LAN and a third host device is connected to the second SAN and second LAN, the second host device is generally capable of knowing of the existence (the IP address, for example) of the first host device via a first LAN but cannot know that the first host is also connected to the second SAN and second LAN and cannot know of the existence of the third host device that is not connected to the first SAN and first LAN to which the second host device itself is connected. In this case, according to the related art, the second host device cannot transmit information to the third host device.

Accordingly, an object of the present invention is to allow information, which is transmitted from a certain host device that is connected to a communication network, to be transmitted to another host device that is not connected to this communication network but is connected to another communication network.

Further objects of the present invention will become evident from the following description.

The information transmission method according to a first aspect of the present invention can be implemented by an information transmission system that transmits information via a communication network. The information transmission system comprises a first host device that is connected to both a first communication network and a second communication network; a second host device that is connected to the first communication network but not connected to the second communication network; a third host device that is not connected to the first communication network but that is connected to the second communication network; a first storage device that is connected to the first communication network but not connected to the second communication network; and a second storage device that is not connected to the first communication network but that is connected to the second communication network. The first storage device comprises a first shared region that is a storage region that is accessible to each of the first host device and the second host device. The second storage device comprises a second shared region that is a storage region that is accessible to each of the first host device and the third host device.

In this case, the second host device writes information to the first shared region via the first communication network. The first host device acquires the information written to the first shared region by the second host device from the first communication network. The first host device writes information that is acquired via the first communication network to the second shared region via the second communication network. The third host device acquires the information written to the second shared region by the first host device via the second communication network.

In a first embodiment of this information transmission method, when writing the information to the first shared region, the second host device prepares one or more attributes relating to the information and transmits the one or more attributes thus prepared to the first storage device. The first storage device receives the one or more attributes and stores the one or more attributes thus received. When acquiring the information from the first storage region, the first host device acquires, from the first storage device, the one or more attributes relating to the information that have been stored in the first storage device. When writing the acquired information to the second shared region, the first host device transmits the one or more attributes thus acquired to the second storage device. The second storage device receives the one or more attributes and stores the one or more received attributes. When acquiring the information from the second storage region, the third host device acquires, from the second storage device, the one or more attributes relating to the information that have been stored in the second storage device.

In a second embodiment of the information transmission method, each of the first host device, the second host device and the third host device judges whether information has been written by itself or by another host device to a shared region that is accessible to the first, second and third host devices respectively. Each of the first host device, the second host device and the third host device acquires the written information from the shared region when an affirmative judgment result is obtained by the judgment step. When acquiring the information via the first communication network, the first host device writes the acquired information to the second shared region via the second communication network and, when acquiring the information via the second communication network, the first host device writes the acquired information to the first shared region via the first communication network.

In a third embodiment of the information transmission method, the first host device monitors whether information of the first shared region has been updated by the second host device and, when it is detected by means of the monitoring step that information of the first shared region has been updated by the second host device, the first host device executes the acquisition step with respect to the updated information.

In a fourth embodiment of the information transmission method, the second host device comprises a host storage region, which is a storage region that allows information to be stored. When the same information is stored in both the host storage region and the first shared region, the second host device updates information that is stored in the host storage region. Further, the second host device reads the updated information from the host storage region, and overwrites, via the first communication network, the updated information thus read with the information prior to the update of the updated information that is stored in the first shared region.

In a fifth embodiment of the information transmission method, according to the first embodiment, the one or more attributes include a valid/invalid attribute indicating whether the information is valid or invalid. When the content of the valid/invalid attribute that is included in the one or more attributes is content indicating an invalid state, the first host device, second host device and third host device respectively do not perform at least one of the acquisition from the shared region of information corresponding with the one or more attributes and the writing of the information to the shared region.

n a sixth embodiment of the information transmission method, according to the fifth embodiment, when writing the information to the first shared region, the second host device prepares one or more attributes relating to the information and transmits the one or more attributes thus prepared to the first storage device. The first storage device receives the one or more attributes and stores the one or more attributes thus received. The second host device updates the content of the valid/invalid attribute that is contained in the one or more attributes stored in the first storage device to content indicating an invalid state. The first host device detects the one or more attributes for which the content of the valid/invalid attribute has been updated to content indicating an invalid state and acquires the one or more attributes thus detected from the first storage device.

In a seventh embodiment of the information transmission method, the first communication network is a storage area network and the second communication network is a storage area network other than the storage area network.

The host device according to another aspect of the present invention is able to access a storage device via a communication network. The storage device comprises a shared region that is a storage region accessible to the host device and to another host device. The host device comprises an access storage portion that allows information relating to the shared region to be stored; a transmission target storage portion that allows a transmission target constituting transmission target information to be stored; and an information processing unit. The information processing unit writes the transmission target to the transmission target storage portion and writes the transmission target thus written to the transmission target storage portion in the shared storage region indicated by the information stored in the access storage portion, judges whether the transmission target has been written to the shared region by an entity other than the information processing unit or the host device and, when an affirmative judgment result is obtained, acquires the written transmission target from the shared region via the communication network and writes the transmission target thus acquired to the transmission target storage portion.

In a first embodiment of the host device, the host device further comprises an attribute storage portion that allows one or more attributes relating to the transmission target to be stored. The information processing unit writes one or more attributes relating to the transmission target that has been written to the transmission target storage portion to the attribute storage portion, acquires the one or more written attributes from the attribute storage portion and transmits the one or more acquired attributes to the storage device and, when the transmission target is acquired from the shared region via the communication network, acquires one or more attributes relating to the acquired transmission target from the storage device and writes the one or more attributes thus acquired to the attribute storage portion.

In a second embodiment of the host device, according to the first embodiment, the host device is also connected to another communication network. Another storage device is connected to the other communication network and the other storage device comprises another shared region, which is a storage region accessible to the host device or to yet another host device. The access storage portion also stores information relating to the other shared region. The information processing unit acquires the transmission target from the shared region via the communication network and, when one or more attributes relating to the transmission target are acquired from the storage device, writes the acquired transmission target to the other shared region via the other communication network and transmits the one or more attributes thus acquired to the other storage device. Further, the information processing unit acquires the transmission target from the other shared region via the other communication network, acquires one or more attributes relating to the transmission target from the other storage device, writes the acquired transmission target to the shared region via the communication network and transmits the one or more acquired attributes to the storage device.

The information transmission method according to yet another aspect of the present invention: is an information transmission method that transmits information from a first host device connected to a first network to a second host device connected to a second host device, comprising the steps of writing information from the first host device to a shared storage region of a first storage device that is connected to the first network; reading information that is stored in the shared region of the first storage device by means of a third host device that is connected to the first network and the second network; writing the read information to a shared region of a second storage device that is connected to the second network by means of the third host device; and reading information that has been written to the shared region of the second storage device by means of the second host device.

In a first embodiment of the information transmission method, the information transmission method can comprise a step in which the fact that information stored in the shared region of the first storage device has been updated is detected by the third host device; and a step in which the updated information is read by the third host device when it is detected that information has been updated.

The host device according to yet another aspect of the present invention is a host device that is accessible via a storage area network to a storage device that is connected to the storage area network. The host device is connected to a plurality of storage area networks and is accessible to storage devices that are connected to each of the storage area networks. The host device comprises an information processing unit. The information processing unit monitors the writing of new information to a specified region of storage devices that are connected to each of the storage area networks and, when the writing of new information to a certain storage device (the specified region, for example) is detected by another host device, reads the information from the storage device via a storage area network and writes the read information to a specified region of another storage device that is connected to another storage area network.

In one embodiment of the host device, the specified region of the storage device is defined by a management server that manages the storage devices that are connected to each of the storage area networks and the information processing unit of the host device is able to manage the specified region thus defined by the management server.

BRIEF DESCRIPTION OF THE DRAWINGS

FIG. 3A shows a constitutional example of a shared region management table;

FIG. 3B shows a constitutional example of a transmission target management table;

FIG. 3C shows a constitutional example of an access control table;

FIG. 4 shows a constitutional example of a GUI screen for displaying information relating to a transmission region;

FIG. 12 shows an example of the flow of processing that is executed when the transmission target is rendered invalid; and FIG. 13 shows an example of the flow of processing that is executed when the transmission target and an attribute group relating to the transmission target are deleted from the shared region.

DETAILED DESCRIPTION OF THE PREFERRED EMBODIMENTS

An embodiment of the present invention will be described hereinbelow with reference to the drawings.

Figure 1:
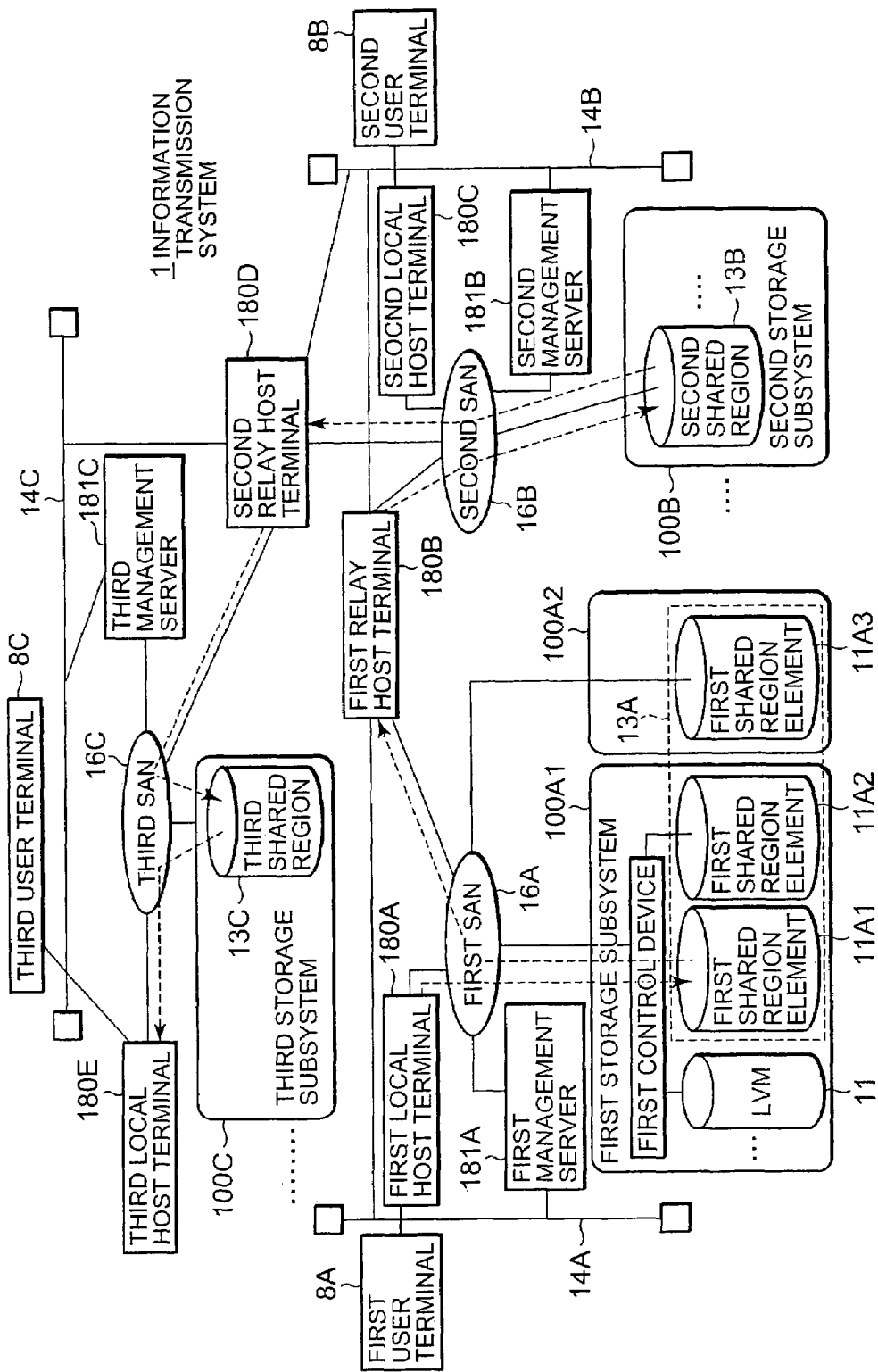
FIG. 1 shows the constitution of the information transmission system according to a first embodiment of the present invention.

FIG. 1 shows the constitution of the information transmission system according to an embodiment of the present invention. Further, in the following description, a branch symbol (the 'A' in 'first host terminal 180A', for example) is added to each of a plurality of similar elements but a branch symbol is not appended when reference may be made to any of the plurality of similar elements (simply 'host terminal 180', for example)

In the information transmission system 1, the host terminal 180B is connected to both the first SAN 16A and the second SAN 16B and therefore these two SAN 16A and 16B are indirectly connected. Similarly, a host terminal 180D is connected to both the second SAN 16B and third SAN 16C and therefore these two SAN 16B and 16C are indirectly connected. Thus, the first SAN 16A, second SAN 16B and third SAN 16C are consecutively linked and the logical distance of the third SAN 16C from the first SAN 16A is further than that of the second SAN 16B. Further, the number of SANs is not limited to three and may instead be four or more, for example. In this case, four or more SANs can be consecutively linked. Further, the SAN connection constitution is not limited to the connection constitution above. A variety of connection constitutions can be adopted for the SAN connection constitution. For example, by connecting a host terminal (not shown) to both the first SAN 16A and the third SAN 16C, the first SAN 16A and third SAN 16C can be indirectly connected. Because the host terminal is connected to a SAN and another SAN, the host terminal indirectly connecting the SAN and other SAN is called a 'relay host terminal' for the sake of convenience hereinbelow. More specifically, the reference number 180B is known as the 'first relay host terminal' and the reference number 180D is known as the 'second relay host terminal'.

There exist one or more host terminals (known as 'local host terminals' for the sake of convenience hereinbelow) 180A that are connected to the first SAN 16A and the first LAN 14A and that are not connected to the second SAN 16B and second LAN 14B, the third SAN 16C and third LAN 14C. One or more first user terminals 8A, for example, are connected to the first LAN 14A, and the local host terminals 180A can communicate with the one or more first user terminals 8A via the first LAN 14A. A local host terminal of this kind is similarly present in the second SAN 16B and the third SAN 16C respectively. Hereinbelow, for the sake of convenience, the local host terminal 180A connected to the first SAN 16A is known as the 'first local host terminal 180A', the local host terminal 180C connected to the second SAN 16B is known as the 'second local host terminal 180C' and the local host terminal 180E connected to the third SAN 16C is known as the 'third local host terminal 180E'.

The first management server 181A, which is for management and so forth of a device connected to the first SAN 16A, is connected to the first SAN 16A and first LAN 14A. Likewise, the second management server 181B is connected to the second SAN 16B and second LAN 14B and the third management server 181C is connected to the third SAN 16C and third LAN 14C.

At least one storage subsystem is connected to each of the first SAN 16A, the second SAN 16B and the third SAN 16C. Hereinafter, for the sake of convenience, the storage subsystem that is connected to the first SAN 16A is called the 'first storage subsystem', the storage subsystem that is connected to the second SAN 16B is called the 'second storage subsystem', and the storage subsystem that is connected to the third SAN 16C is called the 'third storage subsystem'.

Hereinafter, the constitution of each storage subsystem will be described by taking the first storage subsystem as a representative example.

Two first storage subsystems 100A1 and 100A2, for example, are connected to the first SAN 16A. For example, the first storage subsystem 100A1 comprises one or more logical volumes ('LVM' hereinbelow) 11, 11A1 and 11A2, and a control device 18A that controls access to the LVM 11, 11A1 and 11A2 respectively by the first management server 181A and host terminals 180A and 180B that are connected to the first SAN 16A. The control device 18A is a computer device that comprises at least one processor ('CPU', for example) and at least one memory, for example. Each of the LVM 11, 11A1 and 11A2 is a logical storage device that is provided in one or more physical storage devices (hard disk drives, for example). The one or more LVM 11, 11A1 and 11A2 include, for example, an LVM 11 that is not shared between the first relay host terminal 180B and other devices 181A and 180A, for example (in other words, an LVM 11 that is accessible only to a device that is decided beforehand among the first management server 181A and host terminals 180A and 180B) and LVM 11A1 and 11A2, which can be shared between the first relay host terminal 180B and the other communication devices 181A and 180A. The other first storage subsystem 100A2 comprises, for example, as per FIG. 1, an LVM 11A3 that can be shared between the first relay host terminal 180B and the other communication devices 181A and 180A.

The shared region is provided in the first SAN 16A, the second SAN 16B and third SAN 16C respectively. The shared region is a shared region that can be shared between the relay host terminal that is connected to the SAN that comprises the shared region and other communication devices that are connected to the SAN. The shared region is constituted by one or more LVM, for example. More specifically, for example, the first shared region 13A, which exists in the first SAN 16A, is constituted by three LVM 11A1, 11A2 and 11A3; the second shared region 13B, which is present in the second SAN 16B, is constituted by one LVM 13B; and the third shared region 13C, which is present in the third SAN 16C, is constituted by one LVM 13C. Hereinafter, when the shared region is constituted by a plurality of LVM, each of this plurality of LVM is called a 'shared region element' and when the shared region is one LVM itself, the LVM is known as a 'shared region'.

The constitution of the information transmission system 1 was described hereinabove. Further, the internal constitution of the user terminals 8A and 8C, the host terminals 180A and 180E and the management servers 181A and 181C respectively is not illustrated but these terminals and servers are each a computer device that comprises, as hardware resources, at least one processor (a CPU, for example) and at least one storage device (a memory, for example), for example.

As a result of the constitution of this information transmission system 1, for example, information that is transmitted from the first local host terminal 180A can be transmitted via the route indicated by the dotted line in FIG. 1 to the third local host terminal 180E of the third SAN 16C. Hereinafter, an example of the flow of processing that is executed so that information is transmitted from the first local host terminal 180A to the third local host terminal 180E will be described.

The first local host terminal 180A transmits an I/O request that contains transmission target information (referred to as the 'transmission target' hereinafter) and the ID of the storage destination LVM of the transmission target (identification information for the first shared region element 11A1, for example) to the first storage subsystem 100A1 via the first SAN 16A. The control device 18A of the first storage subsystem 100A1 receives the I/O request and transmission target from the first local host terminal 180A and writes the received transmission target to the first shared region element 11A1 of the first shared memory 13A in accordance with the received I/O request.

The first relay host terminal 180B accesses a plurality of shared regions 13A and 13B (when the shared region is constituted by a plurality of LVM, this plurality of LVM) of a plurality of SAN 16A and 16B to which the first relay host terminal 180B is connected and judges whether the access destination shared region has been newly updated. When the newly updated transmission target is found in the second shared region 13B, for example, the first relay host terminal 180B reads the transmission target from the second shared region 13B, writes the transmission target thus read to at least one of the first shared region elements 11A1, 11A2 and 11A3 in the first shared region 13A, whereas, when the newly updated transmission target is found in the first shared region 13A, the first relay host terminal 180B reads the transmission target from the first shared region 13A and writes the transmission target thus read to the second shared region 13B. More specifically, for example, the first relay host terminal 180B compares the date and time for updating the transmission target of the first shared region element 11A1 with the immediately preceding access date and time of the first shared region element 11A1 and, if a transmission target with an update date and time that is newer than the access date and time of the immediately preceding access date and time is present, the first relay host terminal 180B reads the transmission target from the first shared region element 11A1 and writes the transmission target thus read to the second shared region 13B as indicated by the dotted lines in FIG. 1.

The second relay host terminal 180D also similarly accesses a plurality of shared regions 13B and 13C of a plurality of SAN 16B and 16C to which the second relay host terminal 180D is connected and thus judges whether the access-destination shared region has been newly updated. For example, when a newly updated transmission target is found in the second shared region 13B, the second relay host terminal 180D reads the transmission target from the second shared region 13B and writes the transmission target thus read to the third shared region 13C, as indicated by the dotted lines in FIG. 1.

The third local host terminal 180E accesses the third shared region 13C and, when the newly updated transmission target is found, reads the transmission target from the third shared region 13C and stores the transmission target thus read in the storage device (not shown) that the third local host terminal 180E comprises, for example. The third local host terminal 180E is able to transmit the stored transmission target in at least one third user terminal 8C via the third LAN 14C.

According to the flow above, in the information transmission system shown in FIG. 1, the transmission target that is transmitted from the first local host terminal 180A is transmitted to the third local host terminal 180C connected to the third SAN 16C, which is different from the first SAN 16A. Hereinafter, an example of the constitution of the host terminals, management servers and shared regions will be described in detail by taking the first local host terminal 180A, first management server 181A and first shared region 13A as representative examples.

Figure 2:
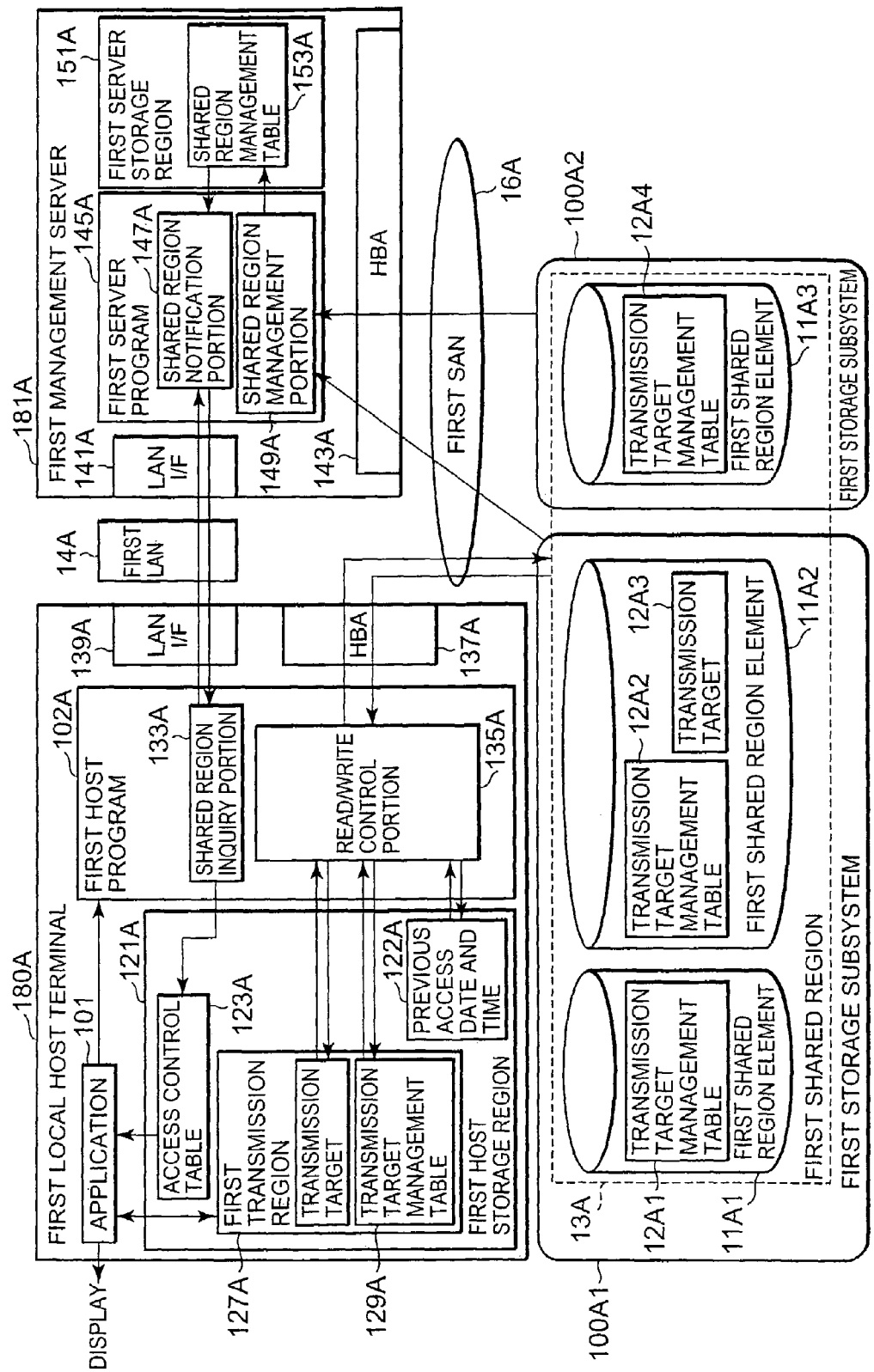
FIG. 2 shows a constitutional example of a first local host terminal 180A, a first management server 181A and a first shared region 13A.

FIG. 2 shows a constitutional example of the first local host terminal 180A, first management server 181A and first shared region 13A.

The first management server 181A comprises a host bus adapter ('HBA' hereinbelow) 143A, which is one of the interface devices for the first SAN, an interface device ('LAN I/F' hereinbelow) 141A for the first LAN 14A, a first server storage region 151A and a first server program 145A.

The first server storage region 151A is a storage region that is provided in a storage device (a memory or hard disk, for example) (not illustrated), that the first management server 181A comprises and that stores a shared region management table 153A, for example. The shared region management table 153A is a table for managing the first shared region 13A that exists in the first SAN 16A that is managed by the first management server 181A. More specifically, for example, as shown in FIG. 3A, for each of one or more LVM (first shared region elements) constituting the first shared region 13A, the shared region management table 153A has the ID (World Wide Name (WWN), for example) of the storage system comprising the LVM, the identifier of the LVM, and notification destination control information registered therein. The notification destination control information corresponding with the LVM is information with regard to which host terminal is notified and/or is not notified regarding the existence of the LVM. In the example in 3A, in other words, the notification destination control information '+( )' signifies that the host terminal corresponding with the host terminal ID (IP address or WWN, for example) in brackets is notified of the existence of the LVM that corresponds with the notification destination control information (a set consisting of an LVM identifier and first storage subsystem identification information, for example), whereas the notification destination control information '−( )' signifies that the host terminal corresponding with the host terminal ID in brackets is not notified of the existence of the LVM corresponding with the notification destination control information (a set consisting of an LVM identifier and first storage subsystem identification information, for example). Further, the notification destination control information '+*' signifies that all the host terminals, which are connected to the same first LAN 14A as the first management server 181A, are notified of the existence of the LVM that corresponds with the notification destination control information, whereas the notification destination control information '−*' signifies that all the host terminals that are connected to the same first LAN 14A as the first management server 181A are not notified of the existence of the LVM that corresponds with the notification destination control information. Further, the combination of '−*' and '+( )' signifies that only the host terminal corresponding with the host terminal ID in brackets is notified of the existence of the LVM and the combination of '+*' and '−( )' signifies that host terminals other than the host terminal corresponding with the host terminal ID in brackets are notified of the existence of the LVM.

At least one of the first storage subsystem identification information, LVM identifier, and notification destination control information may be registered manually by the user of the first management server 181A or may be registered automatically by the first server program 145A.

The first server program 145A is a computer program that operates as a result of being read by a processor (CPU, for example) (not illustrated) of the first management server 181A, for example. The first server program 145A comprises a shared region management portion 149A and a shared region notification portion 147A. The shared region management portion 149A is able to register, in the shared region management table 153A, information (a set consisting of a storage subsystem ID, LVM identifier and notification destination control information, for example) that is inputted by the user or ask one or more of the first storage subsystems 100A1 and 100A2 for the identifier of an unused LVM and then register the LVM identifier that is communicated by way of response in the shared region management table 153A in correspondence with the ID of the storage subsystem that is the source of the communication. The shared region notification portion 147A receives an inquiry relating to the shared region from one or more host terminals that are connected to the first SAN 16A and, in response to the inquiry, references the shared region management table 153A, extracts, from the shared region management table 153A, a set consisting of a storage subsystem ID and LVM identifier that are communicated to the host terminal on the basis of notification destination control information that has been registered in the table 153A and the ID of the host terminal that is the source of the inquiry, and then notifies the host terminal that is the source of the inquiry of the one or more sets thus extracted.

The first local host terminal 180A comprises an HBA 137A, a LAN I/F 139A, a first host storage region 121A and a first host program 102A.

The first host storage region 121A is a storage region provided in a storage device (memory or hard disk, for example) (not shown) that the first local host terminal 180A comprises that stores a first transmission region 127A that permits storage of a transmission target, an access control table 123A for controlling access to the storage subsystem, and previous access date and time data 122A that represents the date and time at which the first transmission region 127A was accessed on the previous occasion, for example. The first transmission region 127A is able to store the transmission target, which is written to the first shared region 13A or read from the first shared region 13A, and store a transmission target management table 129A for managing an attribute group that relates to the transmission target, for example. A constitutional example of the transmission target management table 129A is shown in FIG. 3B and a constitutional example of the access control table 123A is shown in FIG. 3C.

As shown in FIG. 3B, an attribute group that includes at least one attribute of the transmission target is registered for each transmission target in the transmission target management table 129A. The attribute group includes the transmission source ID, transmission target name, final update date and time, final update party, valid deadline, registration destination, valid/invalid flag and acquisition source region, for example.

The transmission source ID is data that includes identification information (WWN, for example) on the device constituting the transmission source of the transmission target (user terminal 8 or local host terminal 180, for example) and the date and time at which the transmission target or the transmission source ID was created (date and time written with the units year/month/day/hours/minutes/seconds, for example) The transmission source ID is unchanged regardless of where the transmission target is transmitted.

The name of the transmission target is the name of the transmission target, such as the file name, for example.

The latest update date and time is the date and time at which the transmission target is ultimately written to the LVM (date and time written with the units year/month/day/hours/minutes/seconds, for example). More specifically, for example, when the transmission target is first written to a certain shared region, the latest update date and time is then the date and time at which the transmission source ID is created (the same date and time as the date and time at which the transmission source ID is constituted, for example) and is rendered the date and time at which the transmission target is ultimately written to a shared region when the transmission target is subsequently shifted to several other shared regions.

The latest update party is the ID of the host terminal that writes the transmission target to the last shared region. Further, in the transmission target management table 129A, the ID of the host terminal that wrote the transmission target in the field of the latest update party may remain as history.

The valid deadline is the valid deadline of the transmission target. At least one of the host terminal 180 and the storage subregion 100 may compare the valid deadline of the transmission target with the current date and time and automatically delete the transmission target if the current date and time is at or beyond the valid deadline.

The registration destination is data representing the location of the transmission target in the transmission region 127 or shared region 13. The registration destination is at least one of a path name, file name and directory name, for example. Stated from a different perspective, for example, the registration destination is information relating to the third shared region 13C (the ID of the third storage subregion 100C and the identifier of the third shared region (LVM) 13C, for example) when the transmission target is transmitted in the order of the first shared region 13A, second shared region 13B and then third shared region 13C.

The valid/invalid flag represents the validity or invalidity of the transmission target. This can be expressed by 1 (valid) or 0 (invalid), for example.

The acquisition source region represents a shared region that is the immediately preceding acquisition source of the transmission target. For example, when the transmission target is transmitted in the order of the first shared region 13A, the second shared region 13B and then the third shared region 13C, the acquisition source region is for information relating to the second shared region 13B (ID of the second storage subregion 100B and identifier of the second shared region (LVM) 13B, for example).

As shown in FIG. 3C, the storage subsystem ID, LVM identifier, SAN information and previous access date and time are registered in the access control table 123A held by the first local host terminal 180A.

The storage subsystem ID and LVM identifier are information that is communicated by the first management server 181A, in other words, identification information for each of the storage subsystem and LVM to which the first local host terminal 180A is granted access.

SAN information indicates in what kind of SAN the shared region is present. When an LVM identifier or the like is received from the management server and the LVM identifier or the like is registered in the access control table 123, for example, the host terminal that performs this registration is able to register the SAN information on the basis of which management server information is received from or via which LAN the information is received. The SAN information may be considered useful to the relay host terminals 180B and 180D in particular. This is because this SAN information makes it possible to specify in which SAN a particular shared region is present.

The previous access date and time registered for each LVM is the date and time at which the LVM was accessed on the previous occasion.

Let us now refer to FIG. 2 once again.

The first host program 102A comprises a shared region inquiry portion 133A and a read/write control portion 135A.

The shared region inquiry portion 133A asks the first management server 181A for information relating to the shared region. In response to this inquiry, the shared region inquiry portion 133A receives information relating to the first shared region element 11 that may be accessed by the first local host terminal 180A (the information subsystem ID and LVM identifier, for example) from the first management server 181A. The shared region inquiry portion 133A registers information that is received from the first management server 181A in the access control table 123A. Further, the shared region inquiry portion 133A is able to make an inquiry to the first management server 181A because information relating to the first management server 181A (IP address, for example) is acquired via the first LAN 14A and registered in the first host storage region 121A, for example.

The read/write control portion 135A controls the writing, reading and so forth of information relating to the LVM that the first storage subsystems 10A1 and 100A2 comprise. For example, when the transmission target is written to the first transmission region 127A by means of application software 101A or the like, the read/write control portion 135A writes the transmission target, which was written to the first transmission region 127A, to the first shared region element 11A of at least one of the one or more first shared region elements 11A1, 11A2 and 11A3 on the basis of the access management data 123A. Thereupon, the read/write control portion 135A extracts an attribute group relating to the transmission target of the write target (a set consisting of the transmission source ID, transmission target name, and so forth, for example) from the transmission target management table 129A and transmits the extracted attribute group to the first storage subsystem 100A that comprises the first shared region element of the transmission-target write destination. Further, the read/write control portion 135A accesses all of the first shared region elements 11A corresponding with information that is registered in the access control data 123A, judges whether a transmission target has been newly written in at least one of the accessed first shared region elements by another host terminal and, when a newly written transmission target is found, reads the transmission target from the first shared region element 11A and writes the transmission target thus read to the first transmission region 127A. Thereupon, an attribute group relating to the read target transmission target (a set consisting of a transmission source ID, transmission target name, and so forth, for example) is extracted from the transmission target management table 12A that is present in the first shared region 11A constituting the reading-source and at least part of the extracted attribute group is changed and the changed attribute group is then registered in the transmission target management table 129A. The read/write control portion 135A are able to judge whether a transmission target has been newly registered in the first transmission region 127A by comparing the date and time contained in the transmission source ID and the date and time represented by the previous access date and time data 122A, for example. Further, the read/write control portion 135A is able to judge whether a transmission target is newly stored in the first shared region element 11A by comparing each previous access date and time registered in the access control table 123A with each latest update date and time registered in the transmission target management table 12A in the first shared region element 12A, for example. Further, the judgment method is not limited to the above method. It is also possible to adopt another method.

The transmission target management table 12A is prepared in at least one of one or more first shared region elements 11A. The constitutional example of the transmission target management table 12A is similar to the constitutional example of the transmission target management table 129A that is illustrated in FIG. 3B.

The application 101A is able to display a GUI screen such as the one illustrated in FIG. 4 ('transmission management GUI screen' hereinbelow) on the basis of information that is stored in the first transmission region 127A. An attribute group that relates to the transmission target stored in the first transmission region 127A, for example, is displayed on the transmission management GUI screen. The application 101A is able to accept operations in which the transmission target desired by the user is rendered valid or invalid and the time of the valid deadline is set, and so forth, via the transmission management GUI screen. When, for example, a valid deadline is inputted for the transmission target desired by the user (transmission target for which a mark has been entered in the check box, for example) and the 'Run' button is pushed, the application 101A is able to register the inputted valid deadline in the transmission target management table 129A in correspondence with the transmission target desired by the user. Further, the application 101A is able to receive a 'delete' request for information selected by the user via the transmission management GUI screen (information for which a mark has been entered in the check box of the 'select' column) and delete this information, or is able to receive an 'update' request and then overwrite the selected information with updated content. Further, when the 'Update & Add' button is pressed, the application 101A is able to receive an input of a new transmission target and an attribute group relating to this new transmission target. Further, this processing may be performed by the first host program 102A in place of or in addition to the application 101A.

Figure 5:
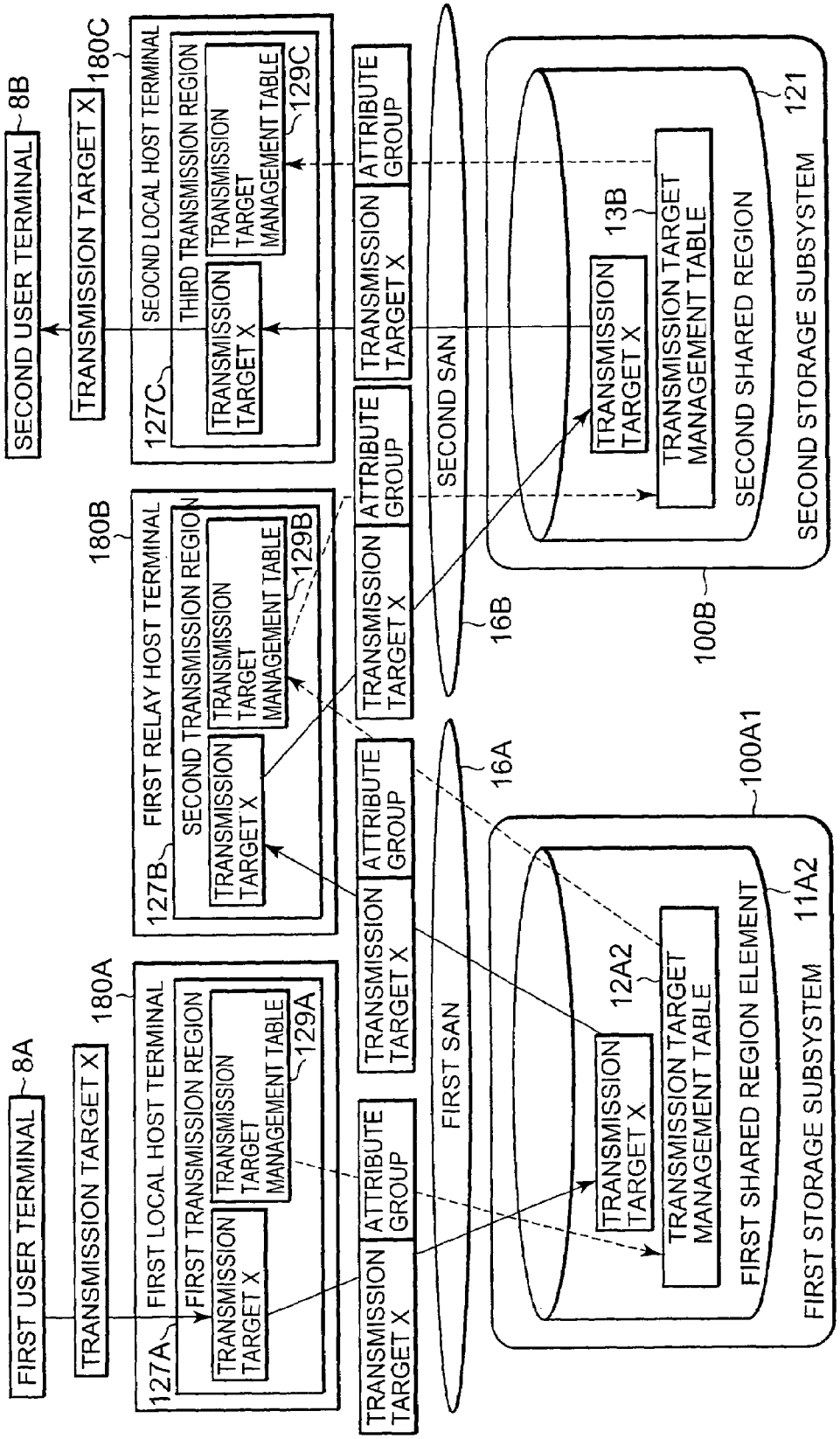
FIG. 5 provides a schematic view up until transmission of a transmission target from the first local host terminal 180A to a second local host terminal 180C.

FIG. 5 provides a schematic view up until transmission of a transmission target from the first local host terminal 180A to the second local host terminal 180C.

The first local host terminal 180A stores a transmission target X in the first transmission region 127A. The transmission target X may be information that is generated by the first local host terminal 180A or, as shown in FIG. 5, may be information that is received from the first user terminal 8A via the first LAN 14A as shown in FIG. 5. The date and time at which the transmission target X is generated by the first local host terminal 180A or first user terminal 8A ('generated date and time' hereinbelow) is associated with the transmission target X. The first host program 102A records the attribute group relating to the transmission target X, that is, at least one of the transmission source ID, the latest update date and time, the latest update party, the valid deadline, the registration destination, and the valid/invalid and acquisition source region, in the transmission target management table 129A. Further, here, the transmission source ID is data containing identification information for the first local host terminal 180A (or first user terminal 8A) and the date and time of the generation of the transmission source ID (or transmission target X). Further, the latest update date and time is the date and time at which the transmission target X is recorded in the first transmission region 127A. The latest update party is the identification information (WWN, for example) of the first local host terminal 180A. The valid deadline and valid/invalid information are information that is inputted by the user via the transmission management GUI screen (see FIG. 4), for example. The registration destination is information indicating the path to the transmission target X in the first transmission region 127A, for example. The acquisition source region is blank because this is not information that the transmission target X has acquired from the LVM in the storage subregion 100, for example.

The first host program 102A retrieves, from the first transmission region 127A, the transmission target (that is, the newly registered transmission target) that was stored in the first transmission region 127A at a later time than the date and time indicated by the previous access date and time data 122A (see FIG. 2) by comparing the date and time indicated by the previous access date and time data 122A (see FIG. 2) and the storage date and time that is associated with the transmission target. The first host program 102A updates, each time the search processing is performed, the date and time indicated by the previous access date and time data 122A to the date and time the search processing is performed. The search processing can be performed at regular intervals.

The first host program 102A extracts the attribute group relating to the transmission target X from the transmission target management table 129A when the transmission target X is sought by means of the search processing. This process can be executed with the transmission-target name of the transmission target X and the registration destination serving as search keys, for example. The first host program 102A writes the transmission target X to at least one first shared region element 11A2 via the first SAN 16A and writes the extracted attribute group to at least one transmission target management table 12A2 (a table that is present in the LVM constituting the writing destination of the transmission target X, for example) via the first SAN 16A. At least one of these write processes is executed by transmitting the write target and a write command containing information indicating the write destination of the write target (an LVM identifier, for example) to the first storage subsystem 100A1 constituting the writing destination, for example. Further, at least one of these write processes can be performed at regular intervals or can be performed directly after the transmission target and the attribute group relating to the transmission target are stored in the first transmission region 127A. In addition, before the attribute group thus extracted is registered in the transmission target management table 12A2, the first local host terminal 180A or first storage subsystem 100A1 updates a predetermined part of the attribute group and, after the predetermined part has been updated, registers the updated attribute group in the transmission target management table 12A2. For example, the first local host terminal 180A or first storage subsystem 100A1 updates the latest update date and time to the date and time at which the transmission target X is written to the first shared region element 11A2 and is able to update the registration destination to information making it possible to specify to where in a particular LVM of which storage subsystem 100 writing takes place (the name of the path containing the storage subsystem ID, LVM identifier, and so forth, for example).

The first relay host terminal 180B is able to perform the processing that appears in the following paragraphs (A) to (C)

(A) The first relay host terminal 180B references the transmission target management table 12A2 of the first storage subsystem 100A1 at regular intervals (or irregular intervals) and searches for the transmission target that was written to the first shared region element 11A2 on or after the date and time at which the first relay host terminal 180B referenced the transmission target management table 12A2 on the previous occasion. This process can be performed by comparing the previous access date and time corresponding with the first shared region element 11A2 that was written to an access control table 123B that the first relay host terminal 180B comprises with the latest update date and time that was written to the transmission target management table 12A2, for example.

(B) When the transmission target X is retrieved from the first shared region element 11A2 as a result of this search processing, the first relay host terminal 180B specifies the attribute group relating to the transmission target X from the transmission target management table 12A2. The first relay host terminal 180B reads the transmission target X from the first shared region element 11A2 via the first SAN 16A, writes the transmission target X thus read to the second transmission region 127B, and then reads the specified attribute group from the transmission target management table 12A2 via the first SAN 16A and writes the attribute group thus read to the transmission target management table 129B of the first relay host terminal 180B. At least one of these reading processes can be executed by transmitting a read command containing information indicating the read target (the name of the transmission target, for example) and information indicating the reading source (the LVM identifier, for example) to the first storage subregion 100A1 constituting the reading source, for example. Further, at least one of these reading processes can be performed at regular intervals. Further, before the extracted attribute group is registered in the transmission target management table 129B, the first storage subsystem 100A1 or first relay host terminal 180B updates a predetermined part of the attribute group and, after updating the predetermined part, registers the updated attribute group in the transmission target management table 129B. For example, the first storage subsystem 100A1 or first relay host terminal 180B is able to update the latest update date and time to the date and time at which the transmission target X is written to the second transmission region 127B, is able to update the registration destination to information that makes it possible to specify where in the second transmission region 127B the transmission target X is written, and is able to update the acquisition source region to information containing the ID of the first storage subsystem 100A1 and the identifier of the first shared region element 11A2.

(C) The first relay host terminal 180B is able to retrieve the transmission target X from the second transmission region 127B by performing the same processing as that of the first local host terminal 180A above. The first relay host terminal 180B is also able to judge that the retrieved transmission target X is information that is acquired from the first SAN 16A by referencing the acquisition source region of the attribute group relating to the transmission target X. Further, when it is judged that the retrieved transmission target X is information from the first SAN 16A, the first relay host terminal 180B is able to extract the transmission target X and the attribute group relating to the transmission target X from the second transmission region 127B on the basis of the access control table (not shown) of the first relay host terminal 180B and is able to write the extracted transmission target X and attribute group to the second shared region 13B via the second SAN 16B.

The second local host terminal 180C is able to read the transmission target X from the second shared region 13B and write the read transmission target X to a third transmission region 127C by executing processes (A) and (B) above. The transmission target X, which has been written to the third transmission region 127C, may be displayed on the display screen (not shown) of the second local host terminal 180C or, as illustrated in FIG. 5, may be transmitted to the second user terminal 8B.

As described hereinabove, as a result of the processing of the host terminals 180, the transmission target is transmitted from a certain SAN to another SAN via a shared region 13 that is prepared for each SAN and a relay host terminal 180 that is connected to two or more SAN. Thereupon, a predetermined attribute in the attribute group relating to the transmission target X is suitably updated in accordance with the write timing and the write destination and so forth. As a result, each host is able to retrieve the transmission target and transmit the retrieved transmission target to another location regardless of where in the transmission region of the host terminal or in a shared region that can be accessed by this host terminal or another host terminal the transmission target is written.

Further, although not especially illustrated, the first relay host terminal 180B is able to read a specified transmission target from the second shared region 13B via the second SAN 16B when it is specified that the transmission target that was written to the second shared region 13B by the local host terminal connected to the second SAN 16B exists, and is able to write the transmission target thus read to the first shared region 13A of the first SAN 16A by performing processing that is the same as that of the first local host terminal 180A. Further, the first local host terminal 180A is able to retrieve the transmission target transmitted to the first shared region 13A from the first relay host terminal 180B by performing the processing of (A) and (B) on the first shared region 13A and is then able to acquire the retrieved transmission target via the first SAN 16A. Further, in this embodiment, the shared region elements can be shared by the relay host terminals 180 and two or more local host terminals 180 that are connected to the same SAN 16, and can be shared by a plurality of local host terminals 180, for example, depending on the content of the notification destination control information corresponding with the shared region elements.

The flow of each of the processes performed by the information transmission system 1 according to this embodiment will be described in detail below.

Figure 6:
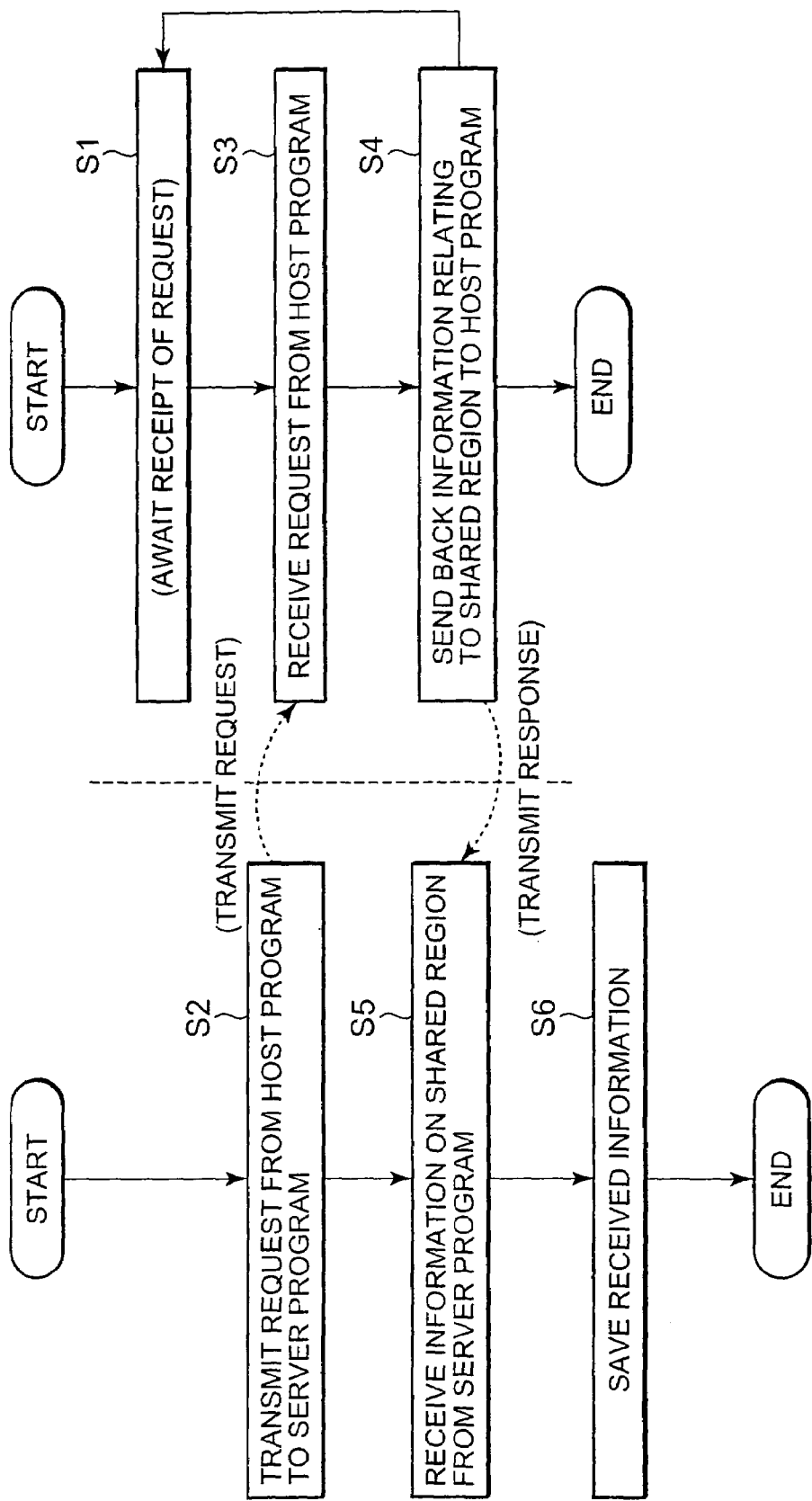
FIG. 6 shows an example of the flow of processing relating to an inquiry and notification of information relating to a shared region.

FIG. 6 shows an example of the flow of processing relating to the inquiry and notification with respect to information relating to a shared region.

The management server 181 enters a state awaiting reception of a request via the LAN 14 from host terminals 180 that are connected to the same SAN 16 and LAN 14 as the management server 181 (step S1).

The host program 102 of the host terminals 180 transmits a request to the management server 181 with optional timing (when the existence (IP address, for example) of the management server 181 is identified, for example) (S2).

Upon receipt of the request (S3), the management server 181 extracts, from the shared region management table 153, information (a set consisting of a storage subsystem ID and LVM identifier, for example) that may be sent to the host terminal 180 constituting the transmission source of the request on the basis of identification information (the IP address or WWN, for example) of the host terminal 180 constituting the transmission source of the request and notification destination control information that is registered in the shared region management table 153, and sends the information thus extracted (information relating to the shared region) to the host terminal 180 constituting the transmission source of the request (S4).

The host terminal 180 receives information relating to the shared region (a set consisting of the storage subsystem ID and LVM identifier, for example) from the management server 181 (S5) and registers the received information in the access control table 123.

Further, in this processing, an LVM attribute that indicates a normal LVM, a shared region element, or the like, may be associated with information that is communicated by the management server 181, for example. In this case, access processing corresponding with the LVM attribute of the access destination can be performed after the host terminal 180 registers information in the access control table 123.

Figure 7:
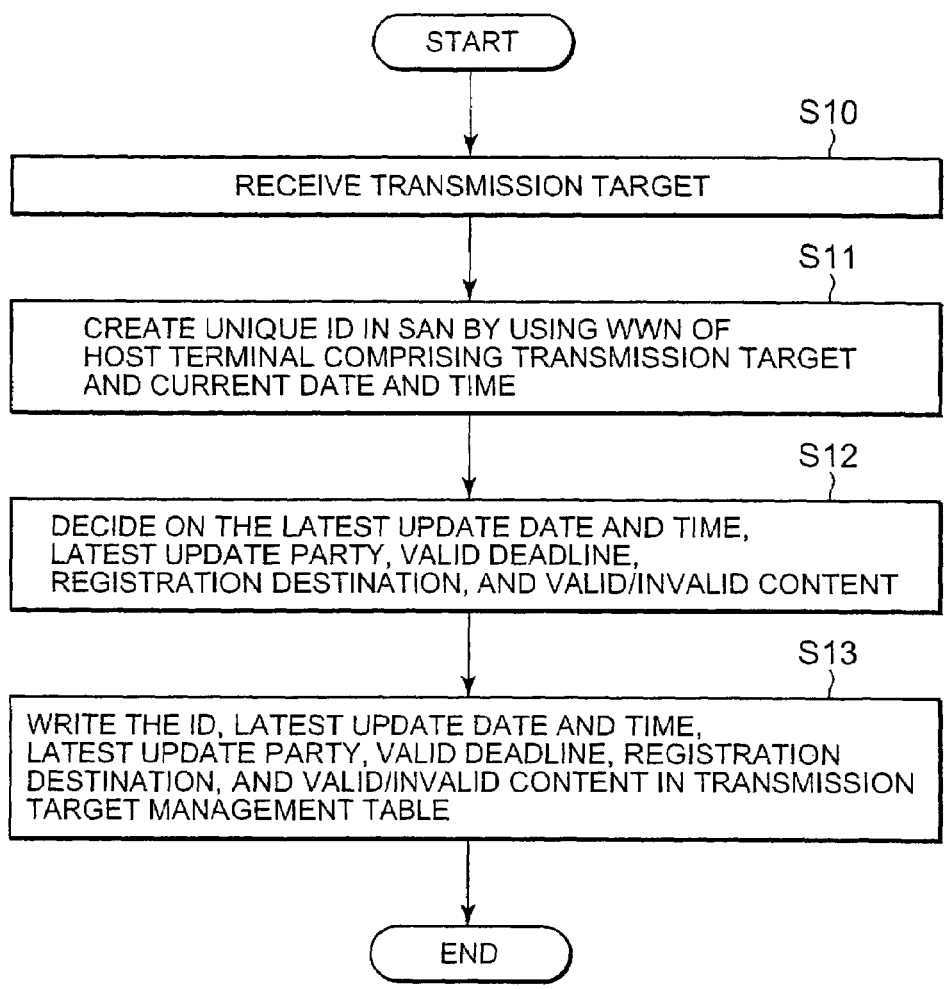
FIG. 7 shows an example of the flow of processing that is executed when a transmission target is newly registered in the transmission region.

FIG. 7 shows an example of the flow of processing that is executed when a transmission target is newly registered in a transmission region.

The processing illustrated in FIG. 7 is performed by the host program 102, which writes the transmission target to the transmission region 127, when the host terminal 180 receives the transmission target from the user terminal 8, for example.

When the transmission target is received from the user terminal 8 (S10), the host program 102 creates an ID that is unique in the SAN in which the host program 102 itself exists, i.e. a transmission source ID that contains the WWN (or other identification information) and current date and time of the host terminal 180 comprising the SAN, for example (S11). Here, the current date and time is the date and time at which the transmission source ID was created and can be detected by a timer of the host terminal 180 that comprises the host program 102.

Further, the host program 102 determines the content of the latest update date and time, the latest update party, the valid deadline, the registration destination, and the valid/invalid content for the transmission target received in S10 (S12). In S12, for example, the latest update date and time can be rendered the date and time at which the transmission target is first recorded in the transmission region 127. Further, the latest update party can be the identification information (WWN, for example) of the host information 180. Further, the valid deadline and valid/invalid may be predetermined content (information such as 'valid' may be set automatically, for example) or may be content that is inputted by the user via the transmission management GUI screen (see FIG. 4). The registration destination can be information indicating the path to the transmission target in the transmission region 127. For example, if a directory with the same name as the transmission source ID is created, a situation where another transmission target and the registration destination are the same can be prevented. The acquisition source region can be blank because this is not information that is acquired by the transmission target from the LVM in the storage subsystem 100.

The host program 102 writes the content determined in S12 in the transmission target management table 129 provided in the host terminal 180 for a variety of information elements relating to the transmission target (S13).

Figure 8:
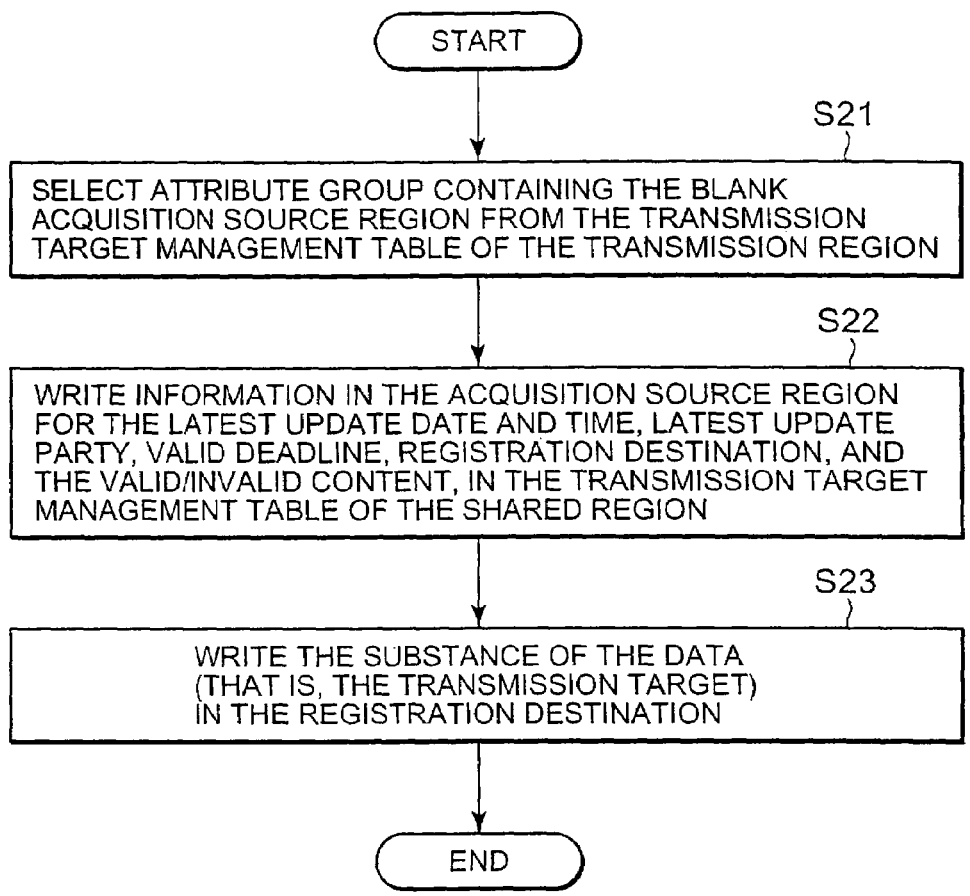
FIG. 8 shows an example of the flow of processing that is executed when a transmission target is newly registered in a shared region.

FIG. 8 shows an example of the flow of processing that is executed when a transmission target is newly registered in a shared region.

The processing that is illustrated in FIG. 8 is performed by the host program 102 that writes the transmission target to the transmission region 127 when the acquisition source region relating to the transmission target is blank, which represents a case where a transmission target is written from the transmission region 127 of the host terminal 180 to the shared region 13, for example.

The host program 102 selects an attribute group for which the acquisition source region is blank (or meaningless data) from the transmission target management table 129 (S21) and writes the information element contained in the selected attribute group in the transmission target management table 12 that exists in the shared region of the transmission-target storage destination (S22). In S22, the host program 102 updates the latest information update date and time in the selected attribute group to the date and time at which the transmission target was written to the shared region 13 and updates the registration destination to information that makes it possible to specify to which shared region element 11 the transmission target was written, for example. Further, the host program 102 affords the acquisition source region information that contains an identifier for the shared region element 11 of the transmission-target write destination and the ID of the storage subsystem that comprises the shared region element, for example. The host program 102 then writes this information in the field of the acquisition source region of the transmission target management table 12.

The host program 102 writes the transmission target in the shared region element 11 (S23). The shared region element 11 constituting the write destination can be rendered an LVM that is identified by the identifier that is registered in the access control table 123 (that is, the identifier communicated by the management server 181) and, when a plurality of such an identifier exists, the host program 102 is able to render an LVM that corresponds with an optionally selected identifier.

Figure 9:
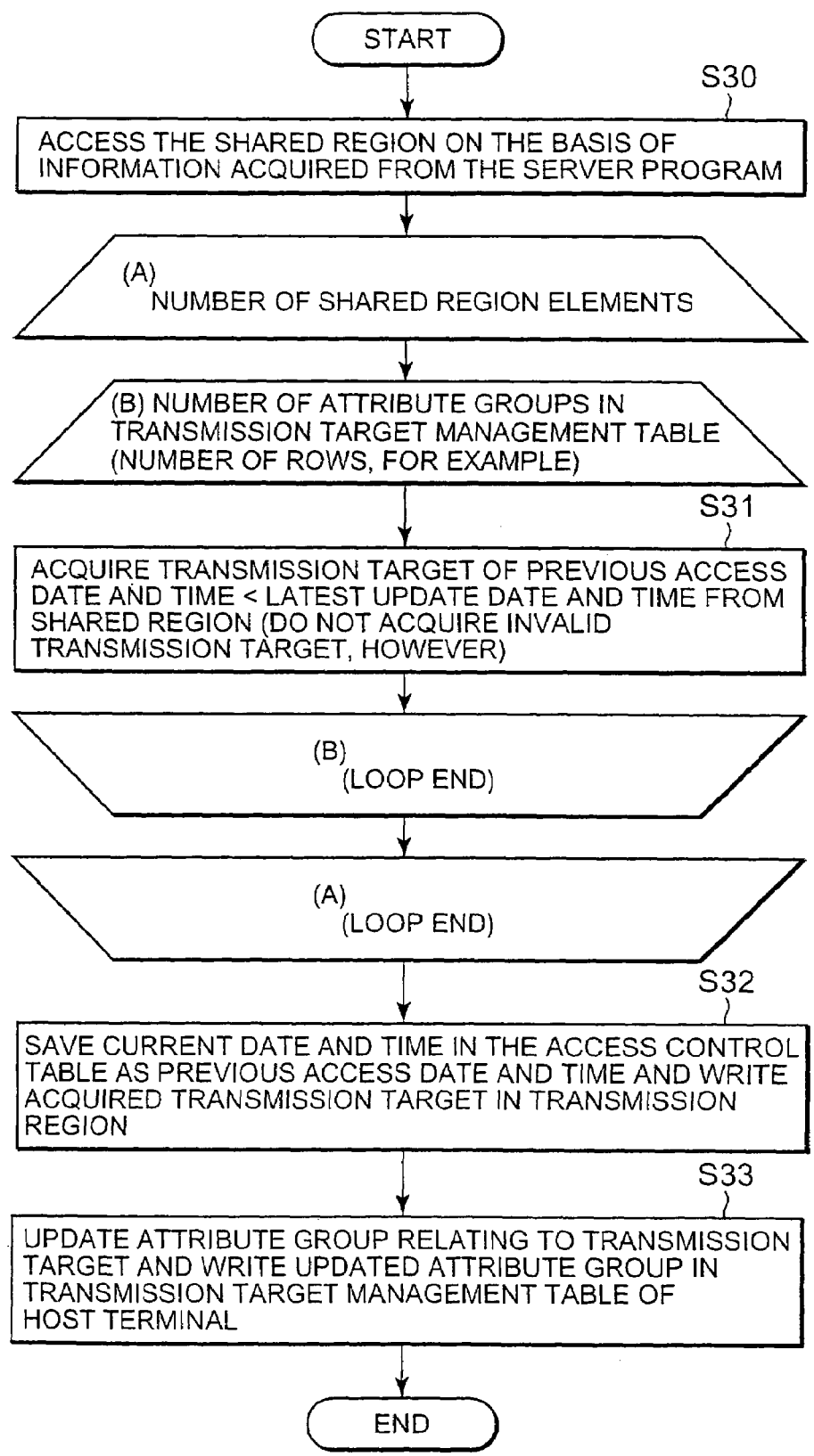
FIG. 9 shows an example of the flow of processing that is executed when a transmission target is acquired from the shared region.

FIG. 9 shows an example of the flow of processing that is executed when a transmission target is acquired from the shared region.

The processing shown in FIG. 9 can be executed at regular intervals by the host program 102, for example. Alternatively, a storage subsystem that identifies that the transmission target has been written to the shared region element 11 communicates this fact to specified host terminals 180 or to all the host terminals 180 that are connected to the same SAN and the host program 102 is also able to execute this processing in response to receipt of this communication.

The host program 102 accesses the shared region element 11 corresponding with the LVM identifier that is specified by the access control table 123 (S30).

The host program 102 compares the latest update date and time that is written in the transmission target management table 12 in the shared region element 11 with the previous access date and time corresponding with the shared region element 11 (the previous access date and time that is registered in the access control table 123), retrieves the attribute group containing a latest update date and time that is later than the previous access date and time from the transmission target management table 12, and then acquires the transmission target corresponding with the attribute group from the shared region element 11 via the SAN 16 (S31). The host program 102 repeats the processing of S31 up to the number m of the attribute group (number of rows m) with respect to the one transmission target management table 12, for example, and also performs n×m repetitions when n (n≧2) of the shared region elements (or shared regions) exist in the same SAN. Further, in S31, the host program 102 need not perform acquisition with respect to an attribute group containing a valid/invalid flag indicating invalid and the transmission target corresponding with this attribute group (the transmission target and attribute group may be deleted, for example).

The host program 102 updates the previous access date and time relating to the shared region element that was accessed by executing the processing of S31 once or a plurality of times (the date and time registered in the access control table 123) to the date and time at which the shared region element was accessed and, when a transmission target is acquired by means of the processing of S31, writes the transmission target to the transmission region 127 (S32). Further, the host program 102 updates a predetermined part of the attribute group relating to the transmission target (the attribute group specified in S31) and writes the updated attribute group to the transmission target management table 129 that the host terminal 180 comprises (S33).

Figure 10:
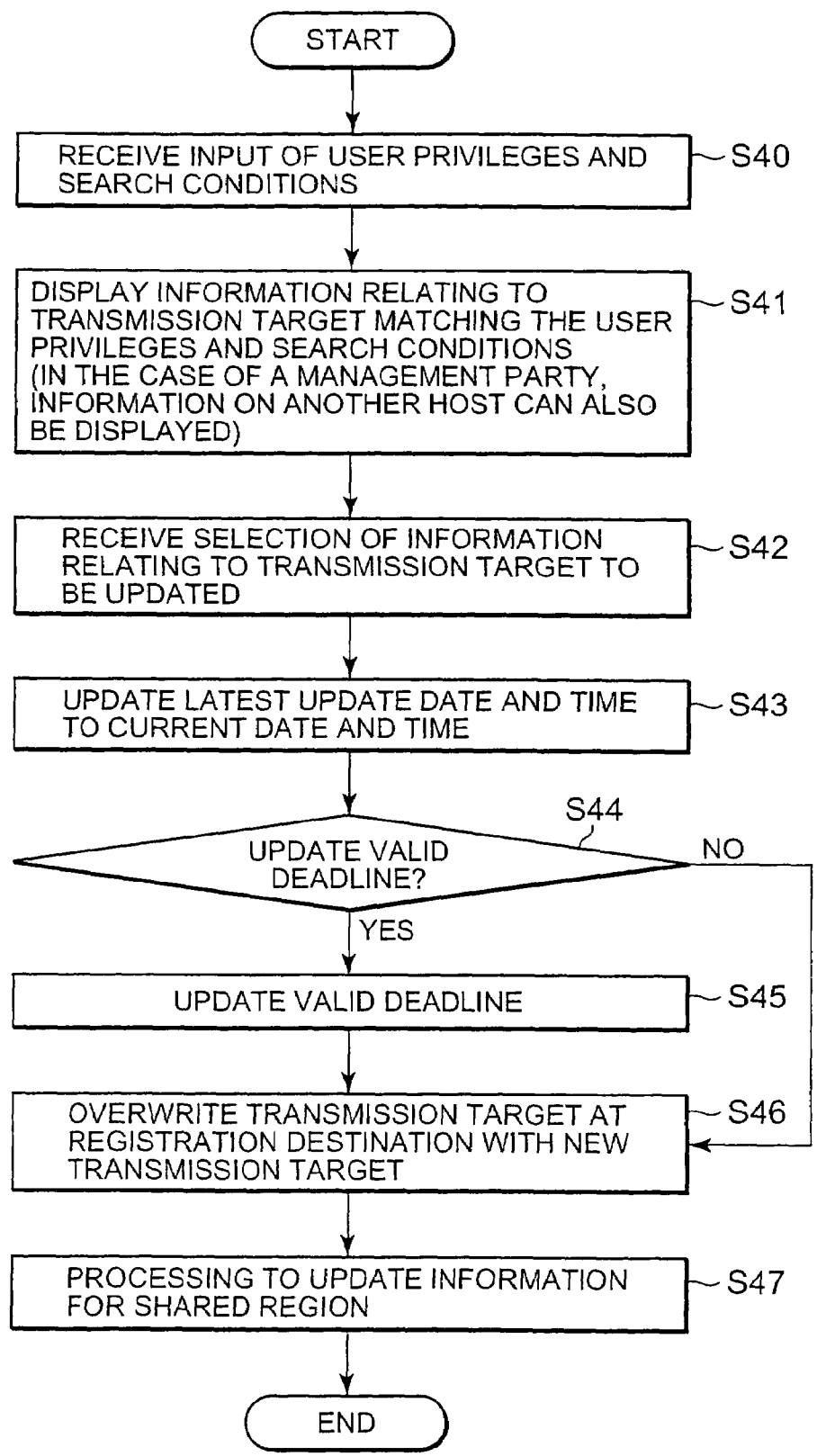
FIG. 10 shows an example of the flow of processing that is executed when the transmission region is updated.

FIG. 10 shows an example of the flow of processing that is executed when the transmission region is updated.

The processing shown in FIG. 10 is performed by the host program 102 when the transmission region 127 is updated by means of an information input from the user terminal 8 or the like (one example is when the transmission target is overwritten), for example.

The host program 102 displays the GUI screen on the host terminal 180 (or user terminal 8) and receives an input of search conditions and user privileges (at least search conditions, for example) from the user via the GUI screen, for example (S40). Inputted search conditions include, for example, attributes relating to the transmission target (at least one of the transmission source ID, transmission target name, registration destination and latest update date and time, for example). Inputted user privileges include 'administrator' or 'general user', for example. When user privileges are associated with a transmission target (a file, for example), the transmission target that matches the user privileges inputted by the user can be sought.

The host program 102 searches for a transmission target that matches the inputted search conditions and user privileges from among the transmission regions 127 and displays the attribute relating to the transmission target thus sought (or the transmission target itself) (displays the attribute or transmission target on the transmission management GUI screen (see FIG. 4), for example). More specifically, for example, when 'administrator' was inputted as the user privileges, the host program 102 searches for the transmission target that matches the inputted search conditions from among all the transmission targets that are stored in the transmission region 127. Further, for example, when 'general user' was inputted as the user privileges, the host program 102 searches for a transmission target that matches the inputted search conditions from among the transmission targets with which 'general user' user privileges are associated, among the transmission targets that are stored in the transmission region 127.

The host program 102 receives, from the user, an attribute group relating to the transmission target to be updated from among the displayed information. When an attribute group relating to the transmission target to be updated has been selected by the user (S42), the host program 102 updates the latest update date and time relating to the transmission target to the current date and time and, when a valid deadline is newly inputted (Y in S44), updates the valid deadline relating to the transmission target to the new inputted valid deadline (S45). The transmission target management table 129 is updated as a result of this processing.

The host program 102 overwrites the transmission target that exists in the registration destination in the information selected in S42 to a transmission target with the new attribute (latest update date and time, for example) (S46).

Thereafter, the host program 102 executes information update processing for the shared region (S47). The host program 102 can execute the processing of S47 immediately after S46 or can execute this processing after a certain time interval has elapsed after S46 is performed. As a result of the processing of S47, the update result in the transmission region 127 can be reflected in the shared region that is accessible to the host terminal 180 that comprises the transmission region 127. The information update processing of S47 will be described subsequently.

Figure 11:
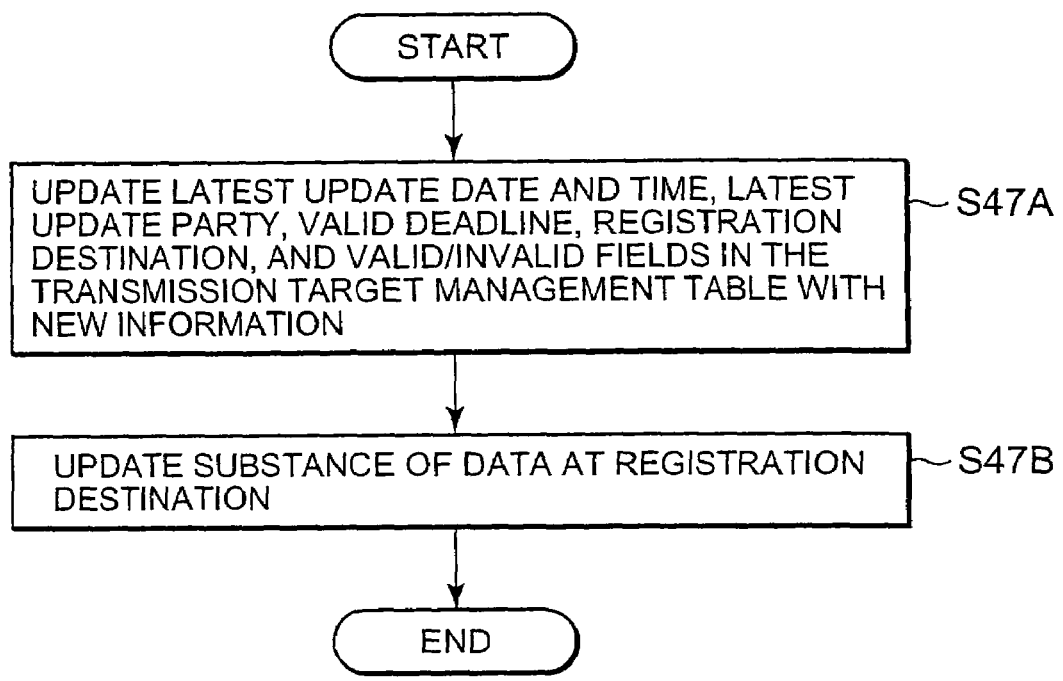
FIG. 11 shows an example of the flow of information update processing for the shared region.

FIG. 11 shows an example of the information update processing of the shared region.

The host program 102 extracts the updated attribute group of the transmission target management table 129 of the host terminal 180, changes a predetermined part (registration destination, for example) of the extracted attribute group, and writes the changed attribute group to the transmission target management table 12 that the storage subsystem 100 comprises (S47A). Further, the host program 102 reads the updated transmission target from the transmission region 127 and stores the transmission target in the shared region 13 (more specifically, the changed registration destination) (S47B).

When the host program of the local host terminals 180A, 180C and 180E performs the processing shown in FIG. 11, the host program is able to render the reflection destination of the updated transmission target in the transmission region 127A and the attribute group relating to the updated transmission target the shared region 13, which exists in the SAN 16 to which the local host terminal comprising the host program is connected, and the transmission target management table 12 in the shared region 13.

On the other hand, when the host program of the relay host terminals 180B and 180D perform the processing shown in FIG. 11, the host program is able to render the reflection destination of the updated transmission target in the transmission region and the attribute group relating to the updated transmission target the shared region 13 and the transmission target management table 12 in the shared region 13 that exist in one or more of two or more SAN 16 to which the relay host terminal comprising the host program is connected. More specifically, for example, the host program 102 is able to judge from what kind of shared region the updated transmission target is transmitted and to what kind of shared region the updated transmission target should be transmitted (for example, the host program 102 is able to judge that the updated transmission target should be transmitted to the second SAN when same is received from the first SAN) and is able to establish the shared region thus judged and the transmission target management table 12 in the shared region as the reflection destination.

FIG. 12 shows an example of the flow of processing that is executed when the transmission target is rendered invalid.

This processing is processing that, instead of deleting the transmission target itself, serves to obtain the same results as processing to delete the transmission target by associating an attribute such as invalid with a transmission target to be deleted.

The host program 102 retrieves the attribute group in which the host terminal 180 comprising the host program is registered from the transmission target management table 12 and displays the retrieved attribute group (S50). The latest update party can be executed by inputting a search condition constituting identification information for the host terminal 180, for example.

The host program 102 selects an attribute group that is to be deleted among one or more of the displayed attribute groups (S51). Here, for example, the host program 102 can also select an attribute group designated by the user as the attribute group to be deleted or can select, as the attribute group to be deleted, an attribute group containing a valid deadline that precedes the current date and time.

The host program 102 updates the valid/invalid flag that is contained in the attribute group to be deleted to 'invalid' and updates the latest update date and time that is contained in the attribute group to the current date and time (S52). The host program 102 overwrites the attribute group selected in S51 with the updated attribute group (S53).

The transmission target management table 12 of the shared region 13 is updated by means of the above processing. Thereafter, another host terminal 180 that is accessible to the shared region 13 references the transmission target management table 12 and, by detecting the newly updated attribute group by means of a comparison between the previous access date and time and the latest update date and time, the attribute group set to invalid is reflected in another host terminal 180 from the shared region 13. The attribute group set to invalid is transmitted to a shared region 13 and host terminal 180 that exist in another SAN 16, and so forth as a result of each host terminal 180 performing the processing shown in FIG. 9 and the processing shown in FIG. 11, for example. Further, when the host terminal 180 registers the attribute group set to invalid in the transmission target management table 129 that the host terminal 180 comprises and when the transmission target corresponding with this attribute group is provided in the transmission region 127, the transmission target is stored in the shared region 13 and transmitted to another host terminal (the transmission target is deleted from the transmission region 127, for example).

FIG. 13 shows an example of the flow of processing that is executed when the transmission target and an attribute group relating to the transmission target are deleted from the shared region.

The processing shown in FIG. 13 can by executed by the server program 145 that is installed on the management server 181, for example.

The server program 145 acquires the valid deadline of each attribute group in the transmission target management table 12 in the shared region 13 (S60) and deletes an attribute group containing a valid deadline, the date and time of which precedes the current date and time, and a transmission target that is specified by a registration destination in the attribute group (that is, the transmission target corresponding with the attribute group) from the shared region 13 (Y in S61; S62, S63).

Further, the server program 145 retrieves the attribute group set to invalid from the transmission target management table 12 in the shared region 13 and deletes the examined attribute group and the transmission target that is specified from the registration destination in the attribute group from the shared region (S65 and S66).

The processing illustrated in FIG. 13 can also be applied to a case where the transmission target and the attribute group relating to the transmission target are deleted from the transmission region. In this case, the host program is able to execute this processing.

This embodiment was described above. In the case of this embodiment, after the transmission target and the attribute group relating to the transmission target in the transmission region 127 have been updated (newly added, overwritten or rendered invalid, for example), each host terminal 180 repeats the processing of FIG. 8, the processing of FIG. 9 and the processing of FIG. 11, whereby the updated transmission target and attribute group can be transmitted from the host terminal to the shared region via the SAN 16, and can be transmitted from the other shared region to another host terminal via another SAN, and from another host terminal to another shared region via another SAN. Further, although not especially illustrated, the host program 102 may execute information processing with appropriate timing (when the transmission target is stored in the transmission region 127 or when the transmission target is read from the transmission region 127 and written to the shared region 13, for example). As the information processing, at least one of the following processes (1) to (5) can be adopted, for example:
  (1) processing to compress or expand at least one of the transmission target and attribute group;
  (2) processing to encode or decode at least one of the transmission target and attribute group;
  (3) processing to authenticate the validity of at least one of the transmission target and attribute group;
  (4) processing to add the transmission path of the transmission target and attribute group to at least one thereof (processing to add the acquisition source region and latest update party or the like to the attribute group as history, for example); and
  (5) processing to perform a virus check on at least one of the transmission target and attribute group and destroy viruses that are found thus.

According to the above embodiment hereinabove, at least one shared region is prepared for each of a plurality of SAN. Further, present in each of the plurality of SAN are a relay host terminal that is connected to the SAN and to one or more other SAN and a local host terminal that is connected to the SAN. The local host terminal writes the transmission target in a shared region that exists in the SAN to which the local host terminal is itself connected and reads the transmission target from this shared region. When the relay host terminal reads the transmission target from the shared region that exists in the SAN to which the relay host terminal is itself connected, the transmission target is written to a shared region that exists in at least one of one or more other SAN to which the relay host terminal is connected. As a result of the local host terminal and relay host terminal repeating such processing, the transmission target that is sent from the certain local host terminal can be transmitted to a host terminal that is connected to a SAN other than the SAN to which the local host terminal is connected (in other words, a host terminal that cannot know of the existence of the certain local host terminal).

Further, according to the above embodiment, when the transmission target and the attribute group relating to the transmission target are updated in the transmission region of the host terminal, the updated transmission target and attribute group relating to the transmission target are transmitted from the host terminal to the shared region that is accessible to the host terminal and the shared region is updated. Further, when another host terminal that checks the update status of the shared region detects the update, the updated transmission target and attribute relating to the transmission target are read from the shared region. By repeating this process, the updated transmission target and attribute group relating to the transmission target are transmitted. Updated transmission targets and attribute groups are transmitted in the same manner irrespective of whether the location that is first updated is a transmission region or shared region. Further, this is also true when transmission targets and attribute groups relating to the transmission targets are deleted. For example, when the valid/invalid flag in a certain attribute group is switched from valid to invalid in the first transmission region 127A or first shared region 13A after the transmission target that was transmitted from the first local host terminal is transmitted to the third local host terminal 180E, the updated attribute group is transmitted to the third local host terminal 180E as a result of the relay host terminals 180B and 180D and the third local host terminal 180E performing the above processing. As described above, according to the above embodiment, the transmission target and at least one of the updated content items in the attribute group relating to the transmission target can be reflected sequentially at each point (shared region and transmission region) of the transmission path of the transmission target. For example, when the transmission target that has been transmitted from the first local host terminal 180A is updated in the transmission region of the third local host terminal 180E, the updated transmission target is also transmitted to a first local host terminal via the third SAN 16C, the second SAN 16B and the first SAN 16A.

The embodiment of the present invention was described above. However, this embodiment is an example serving to illustrate the present invention, there being no intention to limit the scope of the present invention to this embodiment. The present invention can also be implemented in a variety of other forms.

For example, the transmission of the transmission target from the host terminal 180 to the shared region 11 may be executed by means of a write command from the host terminal 180 to the storage subsystem 100 or, conversely, may be executed by means of a read command from the storage subsystem 100 to the host terminal 180. Likewise, the transmission of the transmission target from the shared region 11 to the host terminal 180, for example, may be executed by means of a read command from the host terminal 180 to the storage subsystem 100 or, conversely, may be performed by means of a write command from the storage subsystem 100 to the host terminal 180.

In addition, when three or more SAN are connected to one relay host terminal, for example, although a transmission target that has been read from the shared region 13 of any SAN 16 may be written to any of one or more SAN 16, the transmission target may be preset in the relay host terminal.

Further, for example, the functions of the management server 181 may also be integrated into the host terminal 180. In other words, the management server 181 need not be present. In this case, information that relates to shared region elements that is accessible to the host terminal 180 may be registered beforehand in the host terminal 180.

Further, the transmission target and the attribute group relating to the transmission target may be sent as one data set, or may be sent separately, for example. Further, the transmission target may remain in the transmission source region (transmission region 127 or shared region 13, for example) when the transmission target is sent or may be deleted from the transmission source region. The same is true for attribute groups.

Furthermore, control over which storage regions are shared by which host terminals, for example, is not limited to being based on a set consisting of the LVM identifier and storage subsystem ID but, rather, control can be exercised on the basis of other information such as a block address and so forth, for example.

Moreover, for example, one transmission target management table 12 may be prepared for one shared region or for each shared region element 11. Further, the transmission target management table 12 may be prepared in an LVM or may be provided in a memory (not illustrated) with which the control device 18 of the storage subsystem 100 is equipped. In the latter case, for example, each host terminal 180 may access the transmission target management table 12 via the LAN 14.

What is claimed is:

1. An information transmission method that is implemented by an information transmission system that transmits information via a communication network, wherein the information transmission system comprises:
   a first host device that is connected to both a first communication network and a second communication network;
   a second host device that is connected to the first communication network but not connected to the second communication network;
   a third host device that is not connected to the first communication network but that is connected to the second communication network;
   a first storage device that is connected to the first communication network but not connected to the second communication network; and
   a second storage device that is not connected to the first communication network but that is connected to the second communication network,
   wherein the first storage device comprises a first shared region that is a storage region that is accessible to each of the first host device and the second host device, and
   the second storage device comprises a second shared region that is a storage region that is accessible to each of the first host device and the third host device; and
   wherein the information transmission method comprises:
   writing information to the first shared region by the second host device via the first communication network;
   acquiring the information written to the first shared region by the second host device by the first host device from the first communication network;
   writing information that is acquired via the first communication network to the second shared region by the first host device via the second communication network;
   acquiring the information written to the second shared region by the first host device by the third host device via the second communication network;
   when writing the information to the first shared region, preparing one or more attributes relating to the information and transmitting the one or more attributes thus prepared to the first storage device by the second host device;
   receiving the one or more attributes and storing the one or more attributes thus received by the first storage device;
   when acquiring the information from the first storage region, acquiring, from the first storage device, the one or more attributes relating to the information that have been stored in the first storage device by the first host device;
   when writing the acquired information to the second shared region; transmitting the one or more attributes thus acquired by the first host device to the second storage device;
   receiving the one or more attributes and storing the one or more received attributes by the second storage device; and
   when acquiring the information from the second storage region, acquiring, from the second storage device, the one or more attributes relating to the information that have been stored in the second storage device by the third host device,
   wherein the one or more attributes include a valid/invalid attribute indicating whether the information is valid or invalid, the information transmission method further comprising:
   when the content of the valid/invalid attribute that is included in the one or more attributes is content indicating an invalid state, not performing at least one of the acquisition from the shared region of information corresponding with the one or more attributes and the writing of the information to the shared region by the first host device, second host device and third host device respectively;
   when writing the information to the first shared region preparing one or more attributes relating to the information and transmitting the one or more attributes thus prepared to the first storage device by the second host device;
   receiving the one or more attributes and storing the one or more attributes thus received by the first storage device;
   updating the content of the valid/invalid attribute that is contained in the one or more attributes stored in the first storage device by the second host device to content indicating an invalid state; and
   detecting the one or more attributes for which the content of the valid/invalid attribute has been undated to content indicating an invalid state and acquiring the one or more attributes thus detected from the first storage device by the first host device.

2. The information transmission method according to claim 1, further comprising:

judging whether information has been written by a host device other than itself to a shared region that is accessible to itself by each of the first host device, the second host device and the third host device;

acquiring the written information from the shared region by each of the first host device, the second host device and the third host device when an affirmative judgment result is obtained by the judgment step; and when acquiring the information via the first communication network, writing the acquired information to the second shared region by the first host device via the second communication network and, when acquiring the information via the second communication network, writing the acquired information to the first shared region by the first host device via the first communication network.

3. The information transmission method according to claim 1, further comprising:

monitoring whether information of the first shared region has been updated by the second host device by the first host device, wherein, when it is detected by the monitoring step that information of the first shared region has been updated by the second host device, the first host device executes the acquisition step with respect to the updated information.

4. The information transmission method according to claim 1, wherein the second host device comprises a host storage region, which is a storage region that allows information to be stored and, when the same information is stored in both the host storage region and the first shared region, the information transmission method further comprises:

updating information that is stored in the host storage region by the second host device; and reading the updated information from the host storage region, and overwriting, via the first communication network, the updated information thus read with the information prior to the update of the updated information that is stored in the first shared region by the second host device.

5. The information transmission method according to claim 1, wherein the first communication network is a storage area network and the second communication network is a storage area network other than this storage area network.

6. An information transmission method that transmits information from a second host device connected to a first network to a third host device connected to a second network, comprising:

writing information from the second host device to a shared storage region of a first storage device that is connected to the first network;

reading information that is stored in the shared region of the first storage device by means of a first host device that is connected to the first network and the second network;

writing the read information to a shared region of a second storage device that is connected to the second network by means of the first host device;

reading information that has been written to the shared region of the second storage device by means of the third host device;

when writing the information to the shared region of the first storage device, preparing one or more attributes relating to the information and transmitting the one or more attributes thus prepared to the first storage device by the second host device;

receiving the one or more attributes and storing the one or more attributes thus received by the first storage device;

when acquiring the information from the shared region of the first storage device, acquiring from the first storage device the one or more attributes relating to the information that have been stored in the first storage device by the first host device;

when writing the acquired information to the shared region of the second storage device, transmitting the one or more attributes thus acquired by the first host device to the second storage device;

receiving the one or more attributes and storing the one or more received attributes by the second storage device;

when acquiring the information from the shared region of the second storage device, acquiring, from the second storage device, the one or more attributes relating to the information that have been stored in the second storage device by a third host device that is not connected to the first communication network but that is connected to the second communication network, wherein the one or more attributes include a valid/invalid attribute indicating whether the information is valid or invalid, the information transmission method further comprising:

when the content of the valid/invalid attribute that is included in the one or more attributes is content indicating an invalid state, not performing at least one of the acquisition from the shared region of information corresponding with the one or more attributes and the writing of the information to the shared region by the first host device, second host device and third host device respectively;

when writing the information to the shared region of the first storage device, preparing one or more attributes relating to the information and transmitting the one or more attributes thus prepared to the first storage device by the second host device;

receiving the one or more attributes and storing the one or more attributes thus received by the first storage device;

updating the content of the valid/invalid attribute that is contained in the one or more attributes stored in the first storage device by the second host device to content indicating an invalid state; and detecting the one or more attributes for which the content of the valid/invalid attribute has been updated to content indicating an invalid state and acquiring the one or more attributes thus detected from the first storage device by the first host device.

7. The information transmission method according to claim 6, further comprising:

detecting the fact that information stored in the shared region of the first storage device has been updated by means of the first host device; and reading the updated information by means of the first host device when it is detected that information has been updated.

* * * * *